US012650210B2

(12) United States Patent
Turczan

(10) Patent No.: US 12,650,210 B2
(45) Date of Patent: Jun. 9, 2026

(54) CYMATIC PROJECTION SYSTEMS, METHODS AND DEVICES

(71) Applicant: Lachlan Turczan, Los Angeles, CA (US)

(72) Inventor: Lachlan Turczan, Los Angeles, CA (US)

( * ) Notice: Subject to any disclaimer, the term of this patent is extended or adjusted under 35 U.S.C. 154(b) by 565 days.

(21) Appl. No.: 18/135,170

(22) Filed: Apr. 16, 2023

(65) Prior Publication Data

US 2024/0345426 A1 Oct. 17, 2024

(51) Int. Cl.
*F21S 10/00* (2006.01)
*F21V 9/12* (2006.01)
*G09F 13/24* (2006.01)

(52) U.S. Cl.
CPC .............. *F21S 10/002* (2013.01); *F21V 9/12* (2013.01); *G09F 13/24* (2013.01)

(58) Field of Classification Search
CPC ........... F21S 10/002; F21V 9/12; G09F 13/24
See application file for complete search history.

(56) References Cited

U.S. PATENT DOCUMENTS 3,048,075 A * 8/1962 Wright ...................... A63J 5/10 353/121
4,985,811 A * 1/1991 Weiner ...................... B44C 5/00 362/101
5,683,174 A * 11/1997 Lena, Jr. ................... F21V 9/12 40/406
5,951,405 A * 9/1999 Eigenmann ............... A63J 5/02 472/63
2003/0027643 A1* 2/2003 Rojahn ................. F21S 10/002 472/61
2011/0164405 A1* 7/2011 Boonekamp ............ G09F 13/24 362/101
2017/0051887 A1* 2/2017 Zeng ...................... H05B 45/10
2022/0049826 A1* 2/2022 Fujioka ................. B05B 17/085
2024/0167653 A1* 5/2024 Zhong ..................... F21S 10/00

FOREIGN PATENT DOCUMENTS

CN 119200305 A * 12/2024 ............. H04R 9/025

* cited by examiner

*Primary Examiner* — Bao-Luan Q Le
(74) *Attorney, Agent, or Firm* — Bonini IP Law, LLC; Frank J. Bonini, Jr.

(57) ABSTRACT

Catadioptric projection systems, devices and methods, including a lens, an illumination source and a reflector, arranged to pass light through a medium and focus the light onto a surface, with a vibration source disposed proximate the medium to impart frequencies on the medium to effect movement of the medium, which may be oscillations, patterns or other movements. The vibration source may be a transducer, audio speaker. The illumination source includes one or more illuminators that may be configured as one or more LEDs, and passes through the lens and provides illumination from one side of the lens, to direct the illumination of projected light through the medium and onto the reflector surface, where the light is reflected off of the mirror surface and back through the medium, through the lens, and focused onto a surface. The device is configured with control circuitry for operating the transducer and LEDs.

20 Claims, 9 Drawing Sheets
(7 of 9 Drawing Sheet(s) Filed in Color)

CYMATIC PROJECTION SYSTEMS, METHODS AND DEVICES

BACKGROUND OF THE INVENTION

1. Field of the Invention

The invention relates to projection systems, devices and methods for producing and displaying cinematic images through projections that involve transmission through a manipulated medium, and more particularly to projection systems, devices and methods that generate and display cinematic images produced via cymatic action on the medium through a catadioptric arrangement.

2. Brief Description of the Related Art

The study or effects of visible sound and vibration is generally referred to as cymatics. Cymatics typically involves the observation of the modes of vibration of a structure resulting from a frequency source applied to the structure. One example of cymatic observation is where a plate (e.g., Chladni plate) covered with sand is excited with a frequency source and the sand forms patterns at the nodes and anti-nodes on the plate, representative of the standing vibration waves when in resonance. The term cymatics is often credited to Dr. Hans Jenny (b. 1904-d. 1972), who was a medical doctor and physicist. Dr. Jenny used the term "cymatics" to describe what is a study of vibration and its effect on the organization of matter. The word "cymatics" is a derivation from the Greek 'kuma' which means 'billow' or 'wave,' and is used to describe the effects that sound and vibration have on matter. In many instances, sound is a periodic wave, and the atoms undergo simple harmonic motion. Oscillations and resonance effects may be induced by sound waves, as is the case where the resonant frequency of an object such as a glass is matched by a sound wave, resulting in the shattering of the glass.

Dr. Jenny's work demonstrated how acoustic sounds or vibrations may arrange matter into highly organized patterns, which often comprise symmetrical or repeating patterns. Vibrations have been channeled through mediums such as fine powders, liquids, gels and other substances. For example, when the vibration of a transducer, such as for example a speaker, vibrates a circular dish of water, it is transforming into a type of transverse wave. For this transverse wave, the surface waves on the water move perpendicular (right angled) to the direction of energy transfer (the propagation of the original sound wave).

One example of cymatics involves a thin metallic plate, diaphragm or membrane that is vibrated by exposing it to a sound tone at a certain frequency, and regions of maximum and minimum displacement in the plate are made visible in a thin coating of particles, paste or liquid. The frequency applied to the plate is responsible for the patterns that are formed.

SUMMARY OF THE INVENTION

Systems, devices and methods for producing and displaying cinematic images are provided. The cinematic images are produced and displayed by manipulating a medium and passing light through the medium. The medium undergoes movement from a manipulation source which may be a transducer or other component that imparts a frequency on the medium, and preferably a vibration frequency that moves the medium in a pattern, such as oscillating, pulsating or other movement. Embodiments of the invention provide a projection system and projector that project cinematic images based on the changes taking place in the medium. According to preferred embodiments, the manipulation of the medium is carried out using cymatic movement. The effect of the frequencies transmitted to the medium imparts movement, such as patterns of movement, based on the composition and content of the medium.

According to preferred embodiments, the systems, devices and methods for producing and displaying cinematic images are configured as a catadioptric projection device, that includes a lens and illumination source and a reflector, where the illumination source and lens are provided above the reflector, and the medium is provided between the reflector and the location where the lens and illumination source are disposed. A transducer is positioned in proximity to the medium to generate energy in the form of acoustic waves that impart movement of the medium. The light is projected from the illumination source, away from the lens, and through the medium and to the reflector, and reflected light is reflected from the reflector and back through the medium and reaching the lens, where the light is focused and an output projected from the lens. The projected output preferably is directed onto a surface, such as a screen, wall, ceiling, or other structure. The transducer imparts movement to the medium so that the light passing through the medium, and ultimately projected, provides the effect of cinematic motion. The transducer may be a speaker or other component, which may produce audible sounds (such as, for example, music or other tones), or may produce silent, inaudible vibrations. An amplifier and/or tuner also may be provided in association with or electronically connected with the transducer to further control the output of the transducer.

According to embodiments of the invention, the device includes a medium, which preferably is a substance that is malleable or motile, and, more particularly, in the preferred embodiments, is a fluid. The medium is admitted to the device in an area designed to hold the medium. According to some preferred embodiments, the device is configured with a medium comprising a liquid, such as water. A vibration generator, such as a sound or music generator, is operated to produce the vibrations that are directed at the medium, and which impart movement to the medium. According to some implementations, the vibrations may be audible to humans, or they may be silent to humans, while according to some alternate embodiments, the vibrations may be adjusted or varied to include audible and silent vibrations, or one or more intervals of each. The movement of the medium brought about by the vibration source may be in the form of waves or patterns, oscillations or other movements. The vibration generator may be operated directly or manually, or may be programmed with music or other sounds that are generated and send waves through the medium. The system, method and devices may be configured with programming to operate autonomously, and be programmed with audible sounds or selections, as well as light patterns and colors. According to some embodiments, a user, or one or more or a plurality of users, may have the capability to control or vary the vibrations and colors of light. The vibrations may be in the form of music, and the music may be coordinated with an illumination source of the device, which may comprise a single light source, or multiple light sources, or the capability to provide different and/or combinations of colors or wavelengths.

Embodiments of the systems, devices and methods may be configured to implement strobing coloration and pulse or strobe one or more or a plurality, or combinations of colors. The strobing of the colored light in relation to the cymatic patterns results in illusions of movement or stasis. The patterns may be wave forms that the fluid undergoes when the energy of a particular frequency is broadcast through the medium, which may be carried out using a transducer (e.g., speaker) to provide acoustic vibrations.

The movement of the liquid preferably is carried out by imparting an energy wave or waves that produces a disturbance in the medium, such as the liquid which is disturbed by vibrations that generate wave forms in the liquid. The disturbance may be produced by vibration frequencies that are delivered to the substance of the projector device. The projection systems, devices and methods produce and display cinematic images that show movement as well as monochromatic, or according to preferred embodiments, colors, through projections that involve transmission through a manipulated medium, and through a lens where the patterns are displayed on a viewing surface. The cymatic action on the medium provides movement of the medium in relation to the wave or waves being transmitted through the medium. The cinematic images projected by the device display the movements of the medium, such as water or other substance, in combination with lights which preferably are color lights that produce patterns of light and colors, generating artistic imagery. The imagery may be combined with audible sounds or music providing a cinematic show for users to view and enjoy.

A control may be used to generate a desired or controlled action on the medium. The control may involve a controller that is programmed or programmable, or adjustable by a user to change frequencies of the signals or waves being imparted on the medium to produce a different or desired output or cinematic imagery.

Preferably the medium is a substance through which light can pass through. According to preferred embodiments, the medium is fluid. According to some embodiments, the fluid may be water, liquid, or, according to some alternate embodiments, may be a substance, such as a slurry or other matter.

According to a preferred embodiment, a projection device is provided. The projection device has a space for holding the medium, which, for example, may be a fluid such as water. According to some embodiments, the holding space may be directly on a surface of a reflector. The holding space may comprise a reservoir. The holding space or reservoir preferably is situated between the motivator (such as the vibration source) and the reflector surface, and in the preferred embodiments, is situated between a reflector and an illumination source (and the lens). Some embodiments of the devices may include a sealed reservoir, with panels that permit light to pass through (such as glass or plastic, or other transparent composition). The reservoir may be sealed to contain the fluid according to some embodiments, and according to other embodiments, the reservoir may have an access opening that is designed to access the fluid. This allows the fluid medium to be supplied and replenished as needed, or changed if a different fluid medium is desired. According to some embodiments the fluid reservoir or holder may be configured to receive fluid, such as rain water, directly, or through a conduit. In some instances one or more conduits may be connected to the fluid holder or reservoir. Embodiments also may include a replenishment source, such as a pump that maintains a supply of the fluid, such as water to ensure sufficient coverage of the medium within the projector.

According to a preferred configuration, the reservoir preferably is situated between the motivator and the projection surface, and the system is configured to allow light to pass through the substance contained in the reservoir. In a preferred configuration, the reflector comprises a mirror that is located on one side of the reservoir, with the lens on the other side. The mirror may be provided having a number of shapes or configurations. For example, the mirror of the devices may be curved, parabolic, flat, convex or other shape. According to some preferred embodiments, the mirror is curved, and according to some of the preferred embodiments it is parabolic. The mirror is situated to receive projected light, such as a light beam, from a light source and to reflect that light toward the lens. The lens focuses the light onto a surface. The surface may be a suitable surface onto which the projected light can be viewed. According to some embodiments, the devices, systems and methods project vertically toward a ceiling or dome, and the ceiling or dome surface is where the device output is displayed for viewing of the cinematic images. According to some alternate embodiments, the devices, systems and methods may provide a specially configured surface for displaying the cinematic images. According to some implementations, the system and device produce a light output from the lens that may be directed onto an existing surface (wall, ceiling, panel, other object or the like), where the device orientation may be vertical (for a ceiling or dome projection) or arranged horizontally (for a vertical wall surface projection). According to some other embodiments, the device may include a surface, such as a panel or structure that is associated with or constructed as part of the device, that receives the projected image from the lens, and provides a viewing surface for displaying the cinematic images. Devices may be constructed without the screen panel or with a removable screen panel, to provide an option for projecting directly on a surface (e.g., such as a wall, ceiling, or other panel). Alternatively, a plurality of screen panels or arrangement of them may be used to receive the cymatic projections.

The device may be supported on a support such as a frame or stand, or, according to some alternate embodiments, may be installed on a structure to provide projected images onto a desired location (wall, ceiling, panel or the like). For example, the reflector, the medium, lens and illumination source may be configured mounted on a frame, and set to provide a suitable focusing distance for the lens to illuminate a desired object. The lens and illumination source may be positionable on a frame member relative to the reflector and medium. The vibration source, such as a transducer also may be carried or mounted on the frame. According to some embodiments, the unit may be configured with the components mounted on a frame. According to some other embodiments, the transducer may be a separately mountable and removable unit, designed to fit in a location that will produce vibrations on the medium when operated.

The device includes a motivator that imparts energy onto the substance or fluid. According to preferred embodiments, the motivator produces a frequency or frequencies of waves imparted on the substance, which makes the substance move and exhibit patterns and motion in response to the energy imparted. Light from the illumination source is directed through the medium, and preferably is supplied by a suitable light source, such as, for example, an LED light source. The light source preferably is an LED light source, and may comprise one or more, or a plurality of LEDs. According to some embodiments, the LED may operate to provide light output as the source of light for the projector. According to some other embodiments, the LED may comprise one or more colors that are strobed. Strobing circuitry is employed to regulate the strobing and coordinate the strobing with the transducer or speaker. The circuitry may be integrated in the projection device or may be separately provided or associated therewith. Circuitry may be configured to allow a user (or users) to control the vibrations by selecting or manipulating the frequencies that are produced by the transducer (such as a speaker), as well as to select the light of types of light (colors, continuous, strobing, pulsed or the like).

Methods for producing and displaying cinematic images are disclosed herein. The methods may be implemented using the devices and systems. According to implementations of the method, a fluid and reflector may comprise a mirrored basin of water that is vibrated by an attached or proximally situated transducer with sonic and infrasonic tones to generate cymatic wave patterns within the water. A projection device hung above the basin shines focused light onto the water. This light is reflected and refracted by the cymatic wave patterns in the water. These caustic lights are then focused by the basin mirror, redirecting the light back towards the light source. Around the light source is a larger lens that focuses the caustic light patterns onto an overhead screen (e.g., a ceiling, dome or panel). For alternate configurations, the device and system may project onto a wall or other surface that is vertical, inclined or oriented at a position other than overhead.

These liquid light projections can be presented alongside sounds or music used to generate the imagery, or with alternative sounds or music such that the wave patterns appear to be generated by the music. This choreography of light with sound provides a physical translation of sound into light, or an artistic interpretation or music into light.

Additionally, the projection devices and systems, which according to some embodiments can remain at a constant brightness, can also strobe in relation to the frequencies used to create cymatic patterns in the water. Through varying the rate of light strobe, the projected imagery can appear to be completely static, imbued with more energetic movement, and colored in precise ways. The afterimages of discrete color strobes blend in the viewers eye to create dynamic fields of fluctuating color. This additional mode of projection adds a completely new layer to the projected experience and can also be choreographed to sound or music.

These and other advantages are provided by the invention. Features that are described and shown in connection with an embodiment may be used in conjunction with another embodiment.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
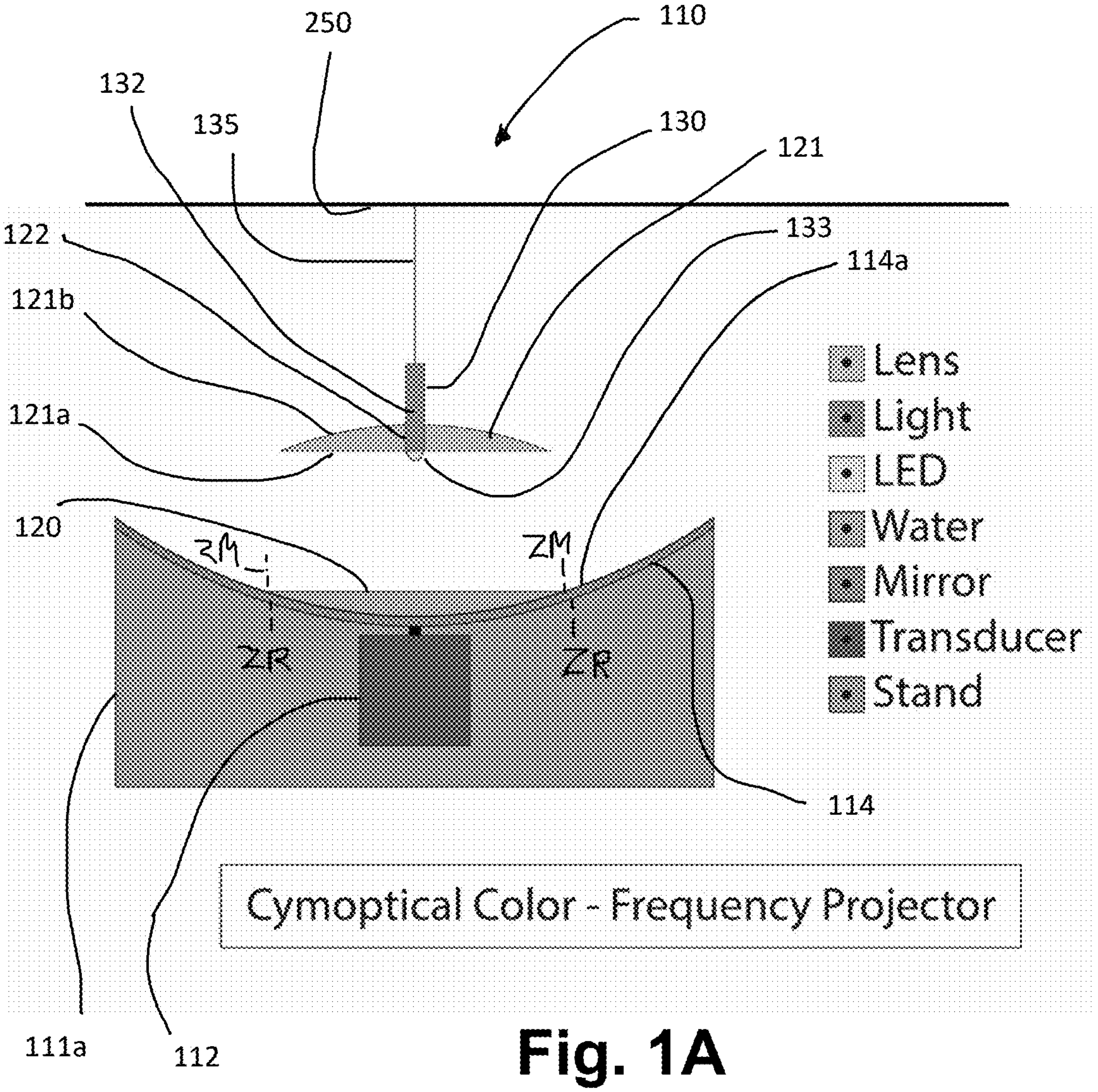
FIG. 1A is a schematic illustration of a projector device according to the invention.
Figure 1B:
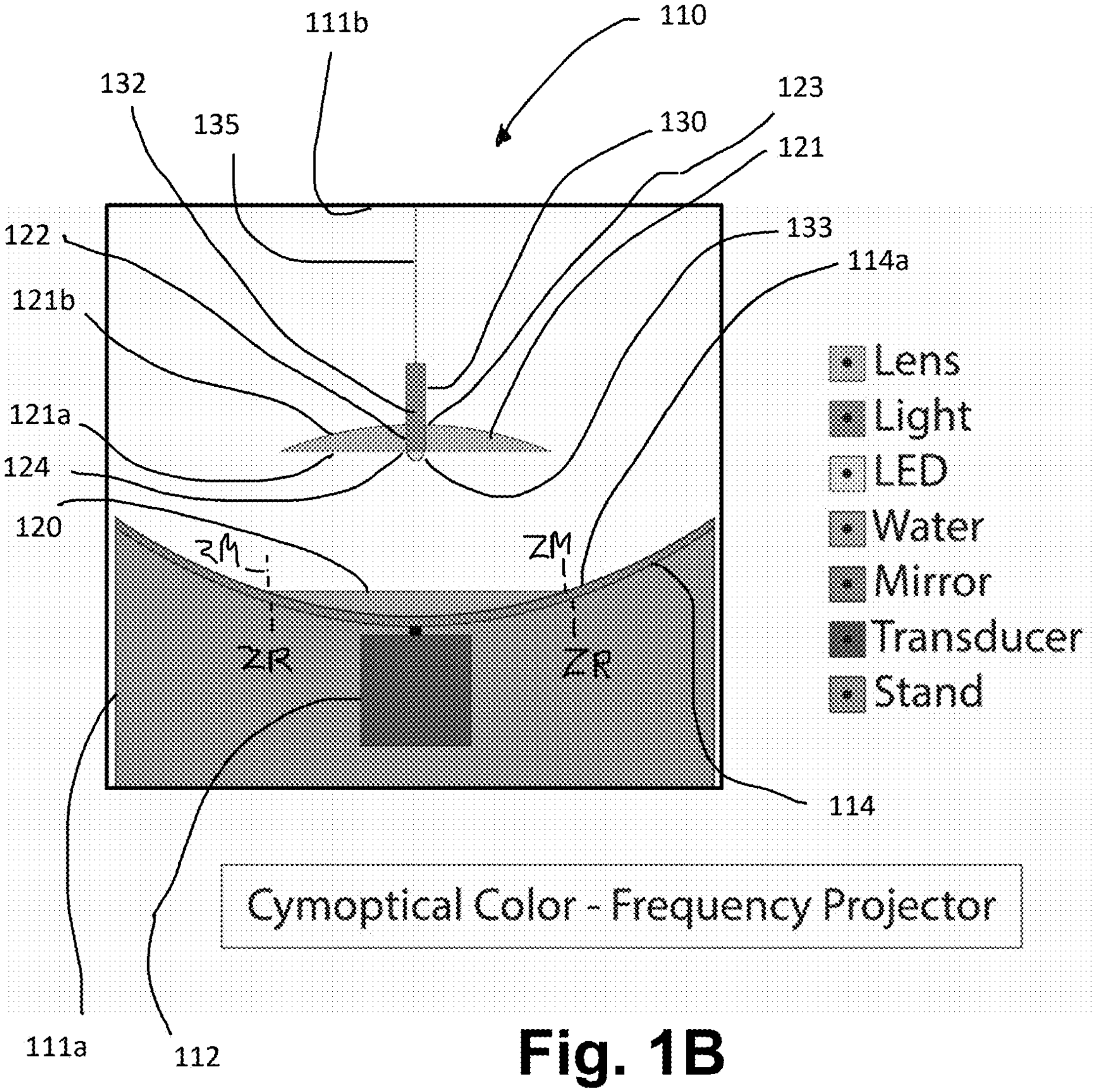
FIG. 1B is a schematic illustration of a projector device according to the invention, shown with an optional surface to mount the illumination source and/or receive the projected image.
Figure 2:
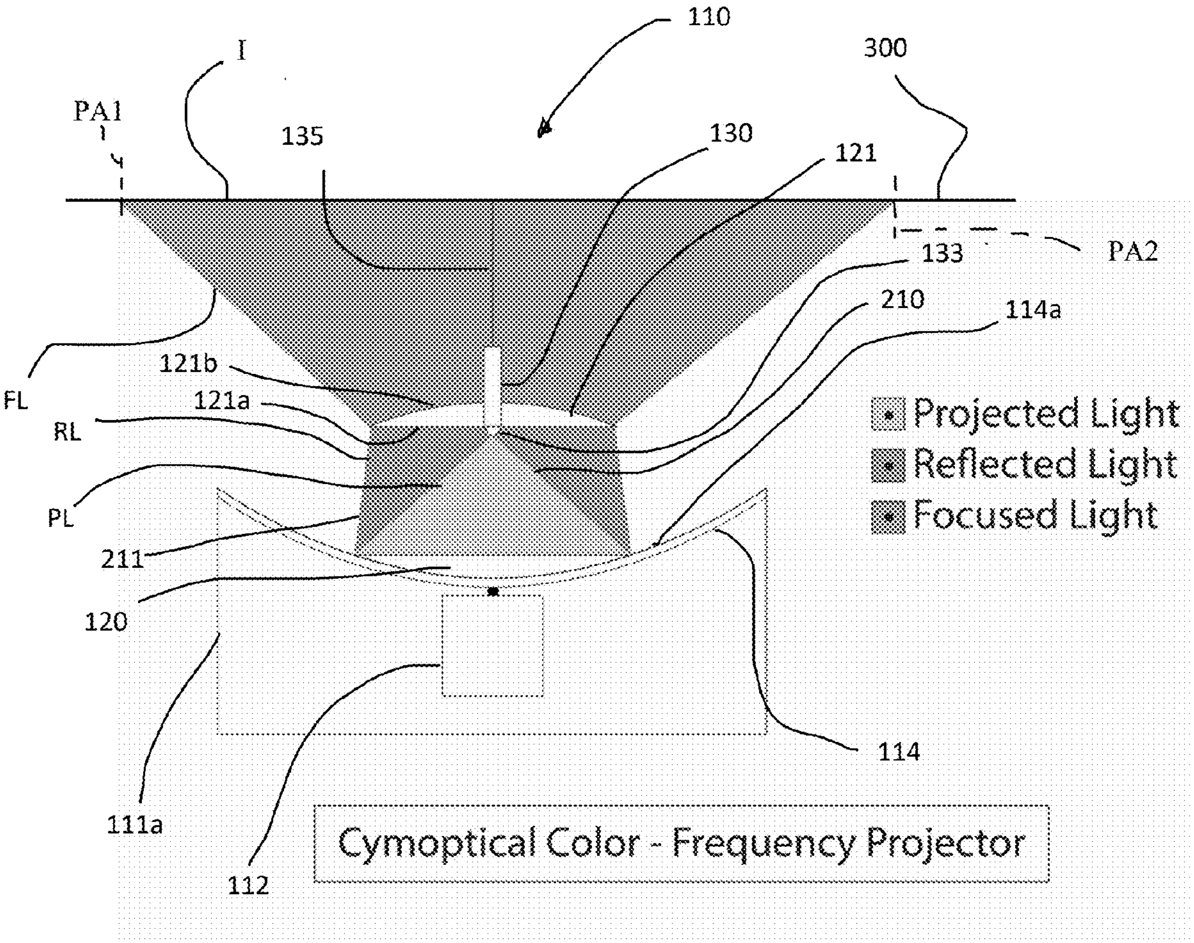
FIG. 2 is a schematic illustration of the projector device of FIGS. 1A and 1B showing an example of a light path through the device.

Referring to FIGS. 1A, 1B and 2, there is illustrated an exemplary embodiment of a device 110 for projecting cymatic images. The device 110 preferably is configured to generate and produce cinematic images that are based on cymatic action of a medium. The device 110 in FIGS. 1A, 1B and 2 is shown in a configuration that has a vertical orientation, wherein the projection is directed upward onto a surface, such as onto a ceiling or dome (FIG. 1A) or, according to some embodiments onto another surface that may be supported by or associated with the device (see e.g., FIG. 1B). Alternate embodiments may be configured to project in one or more other directions, such as on a vertical wall or floor, while some other embodiments may have a surface that receives the projected output of focused light provided as part of the device. According to some alternate embodiments, where the devices and systems do not project directly overhead (as depicted in the exemplary embodiments), the light source and focusing lens are separated and arrayed along opposite sides of the reservoir or fluid containing holder. Embodiments of the catadioptric optical arrangement, in these alternate arrangements implement the light source from the side or direction other than directly above the vertex of the curved mirror. The references to "Cymoptical™" and "Cymoptical Color Frequency Projector™" are trademarks of the inventor for projection apparatus.

According to the exemplary embodiment illustrated, the device 110 is shown supported on a frame 111 and includes a transducer 112 arranged in proximity to a reservoir 113 designed to hold the action media 120. The media 120 is depicted in the illustration as a fluid, and, for example, may be water or other fluid. A reflector or mirror 114 is shown supported on the frame 111. The mirror 114 is depicted according to a preferred embodiment provides in a parabolic configuration. In the embodiment illustrated, the reservoir 113 may comprise the surface of the mirror 114 or portion thereof. The illustration in FIGS. 1A and 1B depicts a sectional view of the device 110. The reflector 114 preferably may be circular or can be rectangular or other shape, but preferably is parabolically configured or curved and has a depression or concavity 114*a* therein to contain the medium 120, such as water or other substance. According to preferred embodiments, as illustrated in FIGS. 1A, 1B and 2, the mirror 114 has a cross-section that is concave and/or parabolic. The reflector surface 114*b* preferably is reflective, such as a mirrored surface, and, according to some embodiments, preferably is reflective over its surface, or has a reflective surface portion provided at least at the location of the reflector surface that corresponds to the location where the medium 120 is located or where the medium 120 is being projected. A projection zone may be defined by a portion of the mirror and/or medium location where the reflected and projected light interact with the medium (see e.g., FIG. 2). The medium 120 for example may occupy a projection portion or active zone that corresponds with the location or locations of the medium 120 and/or reflector 114 where the projected light and/or reflected light path shines (as shown in FIG. 2). For example, the reflector 114 may have an active zone ZR and the medium may have an active zone ZM (which is shown in FIGS. 1A and 1B and corresponds with the locations of the light paths in FIG. 2).

The device 110 is shown having a lens 121. The lens 121 is shown disposed opposite the reflector 114 and in line with the medium 120. According to preferred configurations, the medium 120 is situated between the reflector 114 and the lens 121. The lens 121 is shown according to an exemplary embodiment comprising a plano-convex lens, where one side is convex and the other side planar. The lens preferably is disposed around illumination source, and in addition to the plano-convex lens shown in FIGS. 1A, 1B and 2, the lens may comprise other suitable configurations and types, including, for example, bi-convex, plano-concave, and bi concave. The different lens configurations would allow for smaller desktop iterations of the devices and systems disclosed herein. The lens 121 according to some embodiments has a planar surface 121*a* on one side, and a curvature on the other side, and, in the preferred embodiment illustrated the curvature comprises a convex surface 121*b*, and is a plano-convex lens. The lens 121 may be constructed from any suitable material, such as glass, plastic or other material. The lens 121 is shown separated from and spaced apart from the surface of the media 120.

The device 110 preferably is configured to include an illumination source 130. The illumination source 130 is shown comprising an illuminator having a housing 132 and LED 133. The LED 133 may be a single LED or array of multiple LEDs. Circuitry is provided to control and operate the illumination source 130. The circuitry may include or be linked to a power source, which, for example, may comprise any suitable power source such as supply from an electric power company, a battery, generator, solar panel/cell, turbine or other component, with suitable drivers and/or converters to provide the appropriate power, along with resistors or other components to control the brightness and output.

The preferred embodiment depicted in FIGS. 1A, 1B and 2 comprises a catadioptric projection device 110. In the embodiment, the device 110 includes a lens 121, an illumination source 130 and a reflector 114, where the illumination source 130 and lens 121 are provided above the reflector 114, and the medium 120 is provided between the reflector 114 and the location where the lens 121 and illumination source 130 are disposed. The transducer 112 is shown positioned in proximity to the medium 120 to generate energy in the form of acoustic waves that impart movement of the medium 120. Light PL is projected from the illumination source 130, away from the lens 121, and through the medium 120 and to the reflector 114, and reflected light RL is reflected and refracted from the reflector 114 and back through the medium 120 and reaching the lens 121, where the light (RL) is focused and an output of focused light (FL) is projected from the lens 121. The projected output of focused light (FL) preferably is directed onto a surface, such as a screen, wall, ceiling, or other structure where the cymatic images can be viewed. The transducer 112 imparts movement to the medium 120 so that the light passing through the medium (PL and RL), and ultimately the beam projected (FL), provides the effect of cinematic motion. The cymatic motion corresponds with the movement of the medium 120, and the focused light (FL) from the projection device 110 preferably is displayed in conjunction with the sounds of the acoustic energy that is directed to the medium to produce the movement effects. The sounds may be in the form of music so that the device 110 projects cinematic images in coordination with music.

In the device 110 shown in FIGS. 1A, 1B and 2, the lens 121 is shown having an bore 122 therethrough. The bore 122 preferably comprises a channel that passes through the lens 121, and includes a first opening 123 on one side of the lens 121 and a second opening 124 on the other side of the lens 121. The lens bore 122 is configured to receive the illumination source 130. The bore 122 preferably is disposed in a central location of the lens 121. The illumination source housing 132 may be mounted in the lens bore 122 using a suitable mounting method, such as for example, friction fit, a compressible material, adhesive, threads or other components. Preferably, the mounting mechanism employed does not interfere with the lens 121 and the light path therethrough, or minimizes any effect thereon. According to some preferred embodiments, the housing 132 or portion of the illumination source that resides within the lens bore 122 is configured to prevent light from the illumination source 130 from being distributed in the lens bore 122.

The illumination source 130 is directed toward the reflector 114 and the media 120, with the illumination source 130, as depicted in FIGS. 1A and 1B, being positioned relatively above the media 120 and reflector 114. The light path is illustrated in FIG. 2. Light represented by a light beam 210 emanating from the illumination source 130 is directed toward the media 120 and the reflector 114 situated below the media 120, and is the projected light (PL) in the depiction. The light 210 from the illumination source 130 is reflected off of the reflector 114, and passes through the media 120, as is illustrated by the representation of the reflected light (RL) represented by the light 211. The reflected light 211 reaches the first surface 121*a* of the lens 121, is focused by the lens 121, and exits the lens 121 through the lens second surface 121*b*, which, in the embodiments illustrated, is a convex surface 121*b*. The focused light 212 (FIG. 2) is directed onto a surface, such as the viewing surface 300, where the light output from the projector device 110, shown as the focused light (FL), forms a cinematic image I on the surface 300, and in particular on the projection area of the surface, between PA1 and PA2, where the focused light (FL). In the depiction, the illustration represents a sectional view, and the projection area PA1-PA2 where the focused light (FL) reaches, according to some preferred embodiments, may represent a diameter defining a projection area (area of focused light), or other dimension (side of a rectangle, etc.). The surface 300 is shown represented by a planar surface, but could be a curved, arched, or other configuration, such as for example, a dome, sinuous shaped surface, or other shape. Although referred to as reflected light, the light 211 from the reflector 114 preferably includes reflected and refracted light.

The surface receiving the projected cinematic image may be a fixed surface provided at a fixed distance from the lens 121. According to some embodiments, the surface may comprise a wall or other panel of a structure. Embodiments of the device 110 may include a viewing surface onto which the focused light may be projected to display a cinematic image on the viewing surface. The surface 300 may represent a surface of a wall, panel or other structure, while according to other embodiments, the surface 300 may comprise or be part of the device 110, and may be attached to the device 110, for example, via a frame, such as the frame 111, or other connector.

The action media 120 is manipulated to provide visual effects in the focused light 212 that is projected and focused on a surface. Manipulation of the media 120 is carried out by subjecting the media 120 to acoustic vibrations by operating a generator such as a transducer 112 that produces vibrations. The transducer 112 may comprise a speaker, and preferably is connected to an amplifier, tuner or other signal regulator. Control circuitry preferably is provided to operate the transducer to produce vibrations or sounds that are directed at the media 120, such as, for example, water that is in the reservoir 113 (e.g., which may be on top of the reflector). The control circuitry is configured to provide control over selections of tone, pitch, music or other sounds or vibrations, including audible sounds, as well as inaudible sounds. The movement of the media 120, such as water or other fluid or substance, preferably forms designs or patterns that are reflected as a design or pattern in the light reflected off of the surface of the reflector 114. The light is reflected and refracted by the cymatic waves of the fluid and the lens 121 receives this light (from the reflection off of the reflector 114), and focuses the output onto a viewing surface. The designs or patterns formed display cinematic motion as movements, which correspond with the movement of the fluid as a result of the vibrations imparted on the fluid by the energy (supplied by the transducer 112).

Although a single lens 121 is shown in the exemplary embodiments, a plurality of lenses or focusing elements may be arranged to direct or manage the position of the light and cinematic images on the viewing surface. For example, the lens may be movable to adjust the focus of the focused light so that the projection is clear or a desired viewing effect is achieved (sharp, blurred, etc.).

The frame 111 may comprise a stand 111*a*. According to some embodiments, as illustrated in FIG. 1A, the illumination source 130 may be configured to be mounted separately from the frame 111 or stand 111*a* (such as for example, on a ceiling 250), while according to some embodiments, as shown in FIG. 1B, the frame 111 includes a mount such as the top 111*b* to which the illumination source 130 may be mounted. Preferably, the frame 111 is configured to minimize or eliminate interference with the focused light output from the projector 110. Embodiments of the frame 111 also may include one or more side mounts 111*c*, that extend from the base 111*a* to the top 111*b*, and which may be adjustably provided to change the height of the illumination source 130 and lens 121, and/or relative distance between them and the reflector 114 and medium 120. The illumination source 130 is shown having a mount 135 which also may include electrical wiring to supply power and/or other electronic signals to the illumination source LED as well as circuitry that may comprise the illumination source.

According to some alternate embodiments, the device 110 may be mounted in an environment, where the stand may comprise an existing structure or part thereof, and the surface may also comprise an existing surface or part thereof.

According to some alternate embodiments, the device may be self-contained, and include a viewable screen that is mounted with or associated with the device components. For example, the device may be configured as a personal use device, allowing a user to view cymatic generations of cinematic images on the screen of the device. The screen may be located on a frame or other supporting structure to which the other components of the device are mounted or held.

The medium 120 such as a fluid or other substance, may be provided by placing an appropriate amount of the medium in the space or reservoir 113. The medium 120 may be supported directly on the surface 114*a* of the reflector 114. According to some embodiments, the medium 120 may be supplied manually and admitted to the space 113 manually, while according to some other embodiments, the media 120 may be supplied by a pump or other mobility method or device to deliver an amount of fluid into the reservoir 113, or maintain an amount of fluid therein. This may be beneficial where the device is to be located or installed in an area that is difficult to reach, or where evaporation is likely (e.g., water).

Figure 4:
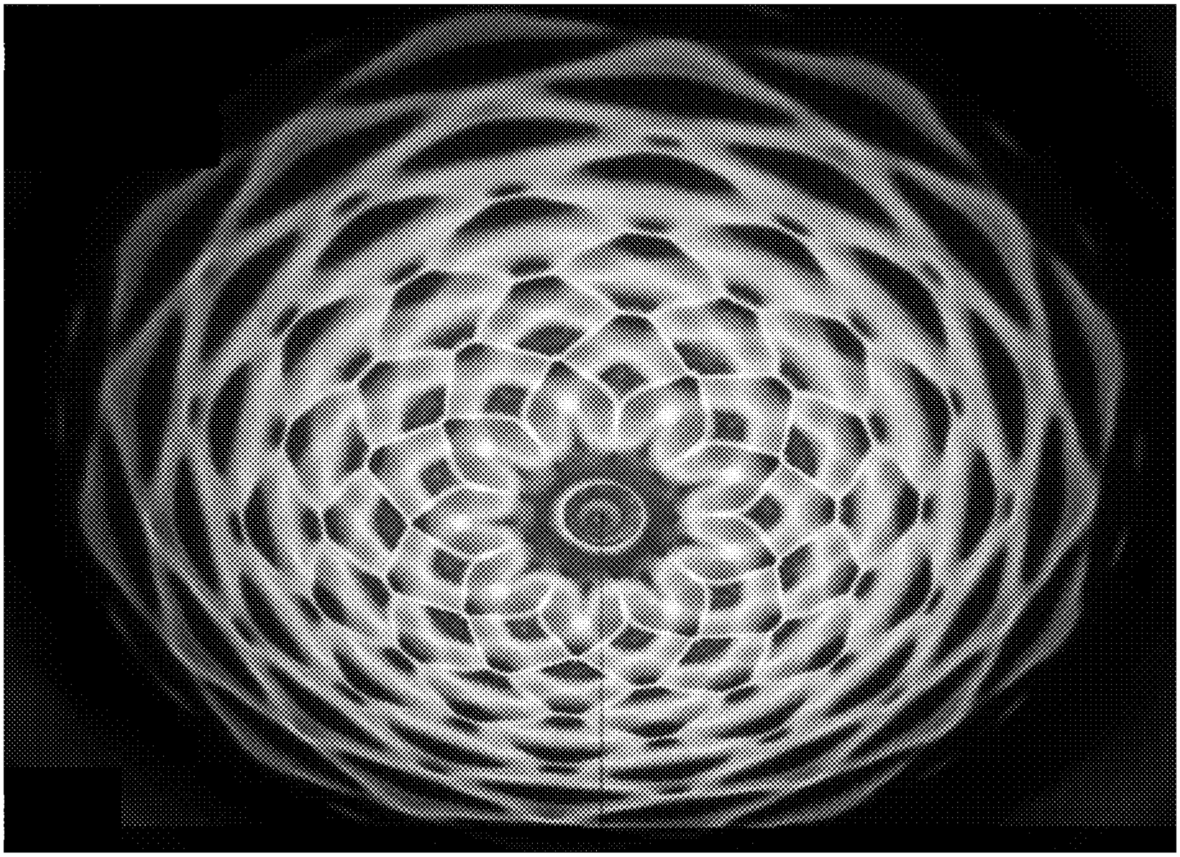
FIG. 4 is a depiction of a cinematic image, shown in a still capture of a frame during the projection, showing the projection output from the device onto a surface.

Referring to FIG. 4, there is illustrated a depiction of a cinematic image, shown in a still capture of a frame during the projection, showing the projection output from the device onto a surface. The imagery is cinematic when viewed and the image, although still in the frame capture represented in FIG. 4, corresponds to the movements in the medium. The movement of the medium 120 is a result of the transducer 112, such as an audio speaker, that provides audible sound while displaying the projected motion of the medium 120 with the focused light from the device 110 which has been projected through the medium, onto the mirror surface and back through the medium to the lens and output onto the viewing surface. The image in FIG. 4 shows the image appearing on a viewing surface.

Figure 5:
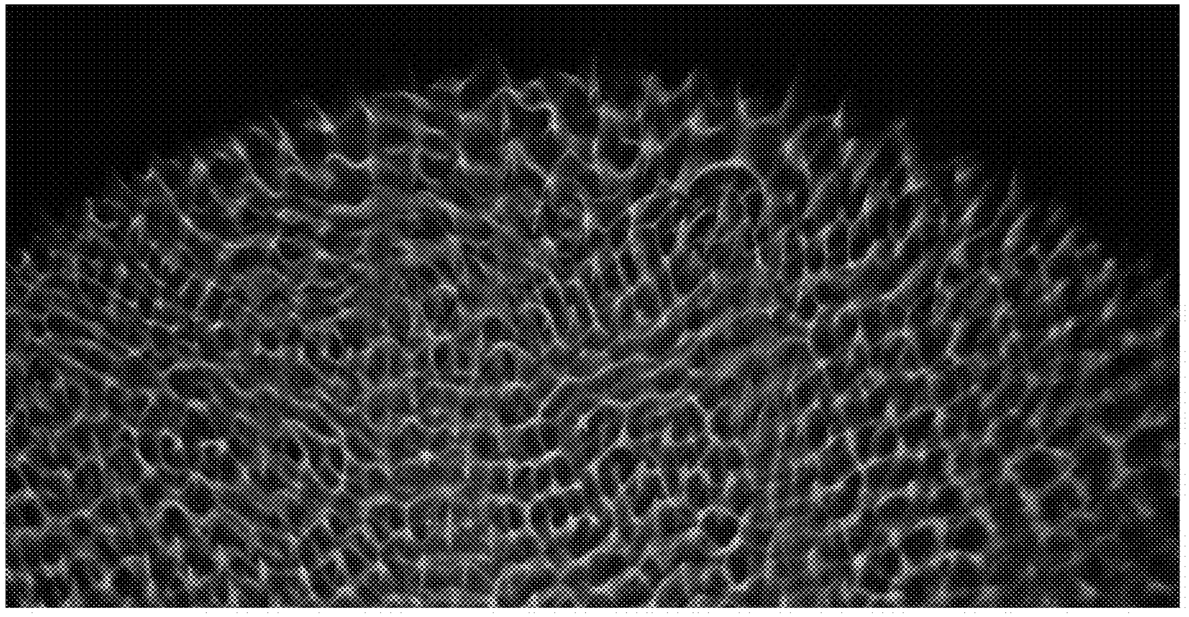
FIG. 5 is another depiction of a cinematic image, shown in a still capture of a frame during the projection, showing the projection output from the device onto a surface for a prismatic imagery.

Referring to FIG. 5, another depiction of a cinematic image, shown in a still capture of a frame during the projection, showing the projection output from the device onto a surface for a prismatic imagery. In FIG. 5, the device displaying the image is configured to display RGB cymatic projection with light frequency matched to the frequency of the medium, which in this image is water. The prismatic projection depicted in FIG. 5 shows colors that represent the movement of the fluid and energy imparted, which is matched to the light frequency. The control circuitry is configured to control the transducer to produce a frequency that is directed to the medium or water in this example. The control circuitry, which may be the same control circuitry for controlling the transducer, or separate control circuitry, or associated or linked circuitry, controls the illumination source to output colored light having a frequency that is matched to the frequency of the transducer. Movements of the water and light projected from the device produces cinematic imagery that results in movements and color changes and interactions. FIG. 5 shows a frame of the cinematic motion, as an example. The device 110 is configured with the illumination source 130 having LEDs (red, green and blue LEDs) that produce colored light, and which is controllable to produce light frequencies of RGB light. This provides options to utilize RGB LED (e.g., red, blue and green LEDs) in combination to produce over 16 million hues of light. White light (white LEDs) also may be included.

Figure 6:
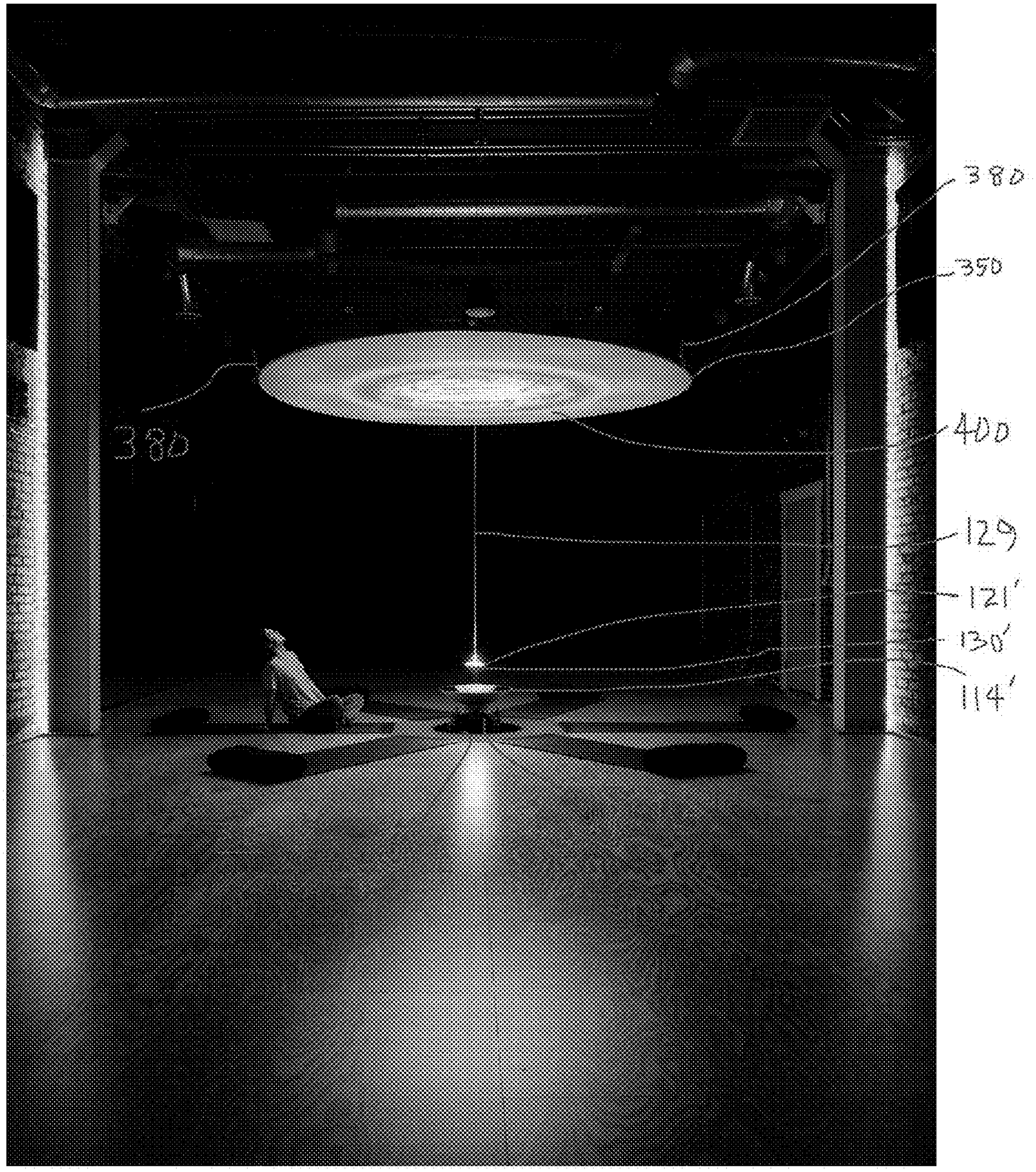
FIG. 6 is a perspective view of an installation where the device is shown projecting on a surface.

FIG. 6 shows an installation where the device 110' is shown projecting on a surface 250'. The device 110' is shown supported on a surface which is a floor 350. The reflector 114' is shown comprising a mirror bowl or basin, wherein the medium is held. The device 110' is supported on a base or frame 360 which is shown resting on a floor 370. The lens 121' is shown suspended above the reflector 114', and is supported on a cable 129. An illumination source 130' is shown and is provided in the lens 121'. The illumination source 130' preferably comprises one or more LEDs. The cable 129 preferably may comprise or include electrical connections to power and/or control the illumination source 130'. The cable 129 is suspended on the ceiling or the projection surface 250', or may extend through the projection surface 250' and secure to the ceiling or other structure. In the exemplary installation, the projection surface 250' is shown with brackets 380 that suspend the surface 250' from the building structure. In the installation shown, one or more individuals may view the cinematic projection 400 that is projected onto the screen 250'. The power source for the transducer 112' preferably is located in the base or with the transducer. The power source for the illumination source 130' preferably may be located remote from the LED, and connected through the cable 129 to supply power to the LED.

Alternatively, according to some alternate embodiments, power to power the illumination source may be supplied in a housing that houses the LED (such as for example, where battery power is used).

Figure 7:
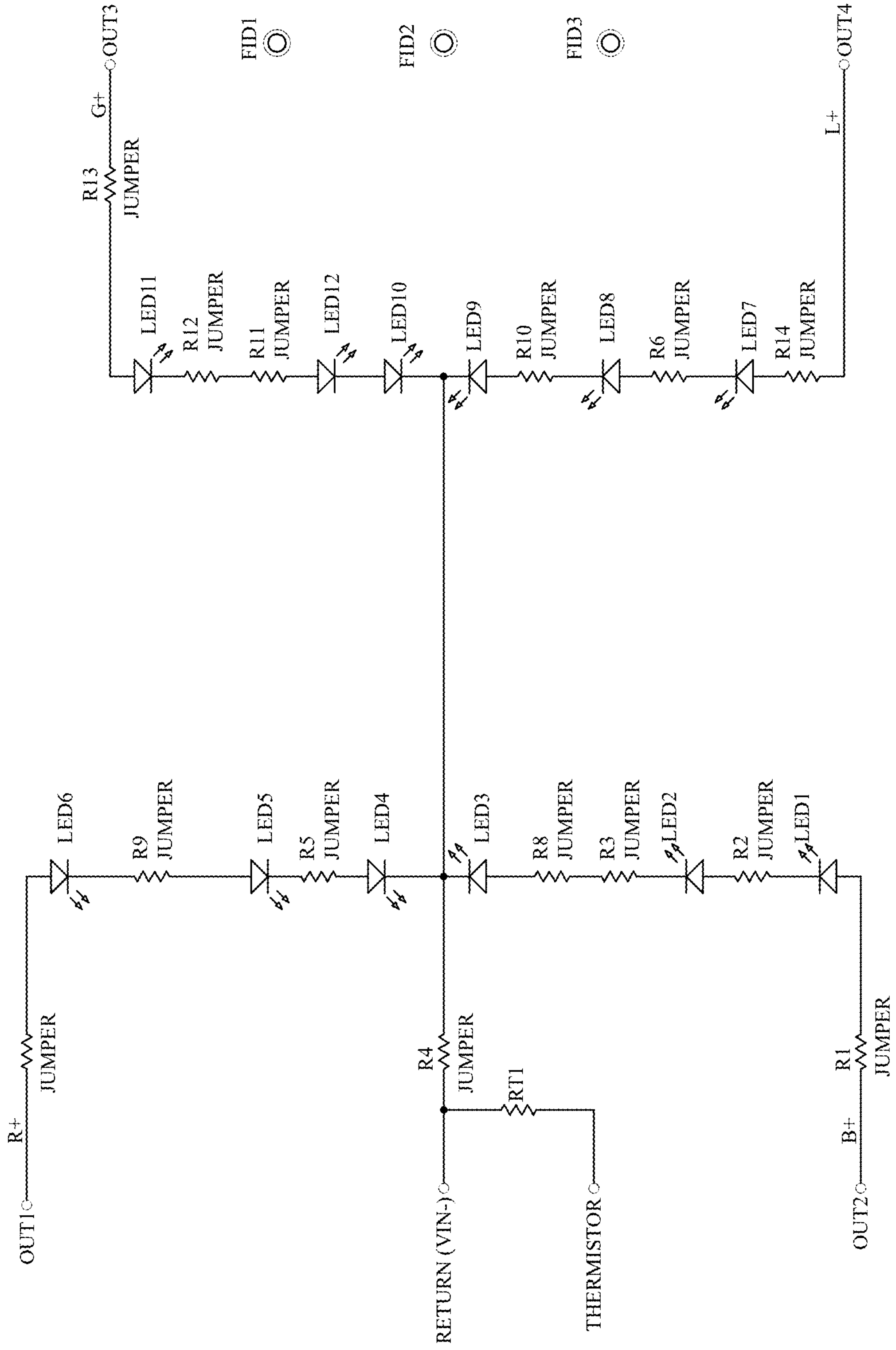
FIG. 7 is an exemplary depiction of a circuit diagram showing an LED arrangement with RGB and white LEDs.

FIG. 7 is an exemplary depiction of a schematic diagram of an LED circuit showing the implementation of RGB LEDs to produce millions of color hues. The illumination source 130 preferably may include LEDs comprising red, green, and blue, and also may include white LEDs. The control circuitry is configured to operate the illumination source and actuate one or more of the LEDs to produce light, or strobe or pulse light. The control circuitry may be configured with a power supply or power source and may be included in the illumination source housing 132, or may be separately provided, and electronically linked or coupled to the LED lights 133 in the illumination source 130. Embodiments may configure the control circuitry of the LEDs with or to include control circuitry for the transducer 112, or according to some embodiments, the transducer may have separate control circuitry, which may be linked with or electronically coupled to communicate with the LED control circuitry. The control circuitry also may be electronically linked or coupled to a user interface, which may be wired or wireless, and provide the user with options to vary the LED output, LED colors, or category of displays, as well as to control or manage the output of the transducer 112. Although a schematic depiction is shown in FIG. 7, any suitable circuitry for controlling the illumination source 130, and the LED lights may be used. The control circuitry preferably receives the signal from the transducer so that the LEDs may be operated to provide an output that is coordinated with the vibration frequency of the transducer. The vibration signals, such as acoustic signals, may be converted (e.g., digital to analog, or other) and processed, and used to control the LED operations.

Figure 8:
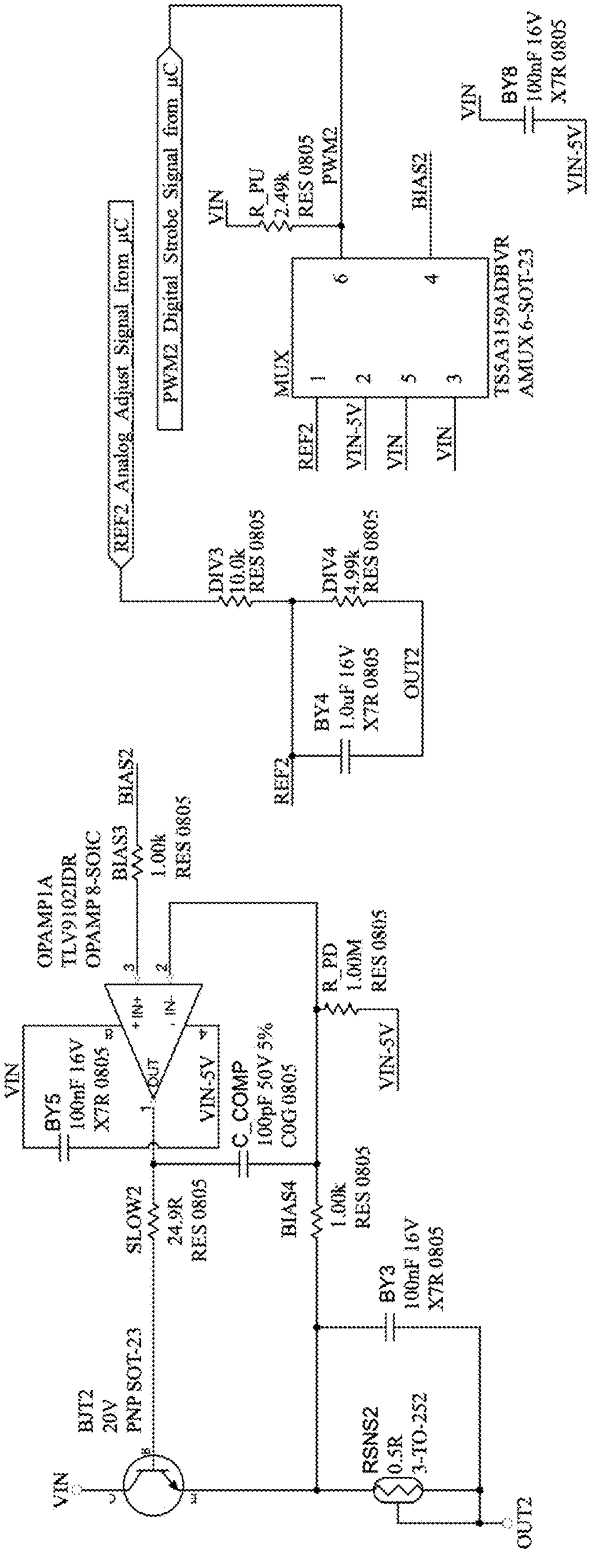
FIG. 8 is an exemplary depiction of a circuit diagram showing circuitry for network connections and communications for the device.

FIG. 8 is schematic diagram showing an exemplary circuit diagram of an example where electronic connections are shown comprising a multiplexer and other components. However, any suitable control circuitry may be used in conjunction with the device components, including circuitry known and available for powering and controlling LEDs and acoustic vibrations, sounds and music.

The device 110 may be operated using a user interface that may take place through a suitable communication mechanism, including low power such as Bluetooth, or Wi-Fi, cellular, ethernet, or other signal transmission method. The device 110 may be controlled using a computer, smartphone or separate controller that includes a chip with embedded logic software with instructions for controlling and operating the device 110. Software applications are designed to provide communications from a user device, or other computer, to perform operations, including turning on and off the power, selecting the tuning for the vibrations or sounds (which may be music selections), as well as selection of the lighting (hue, color, intensity and the like).

Figure 3:
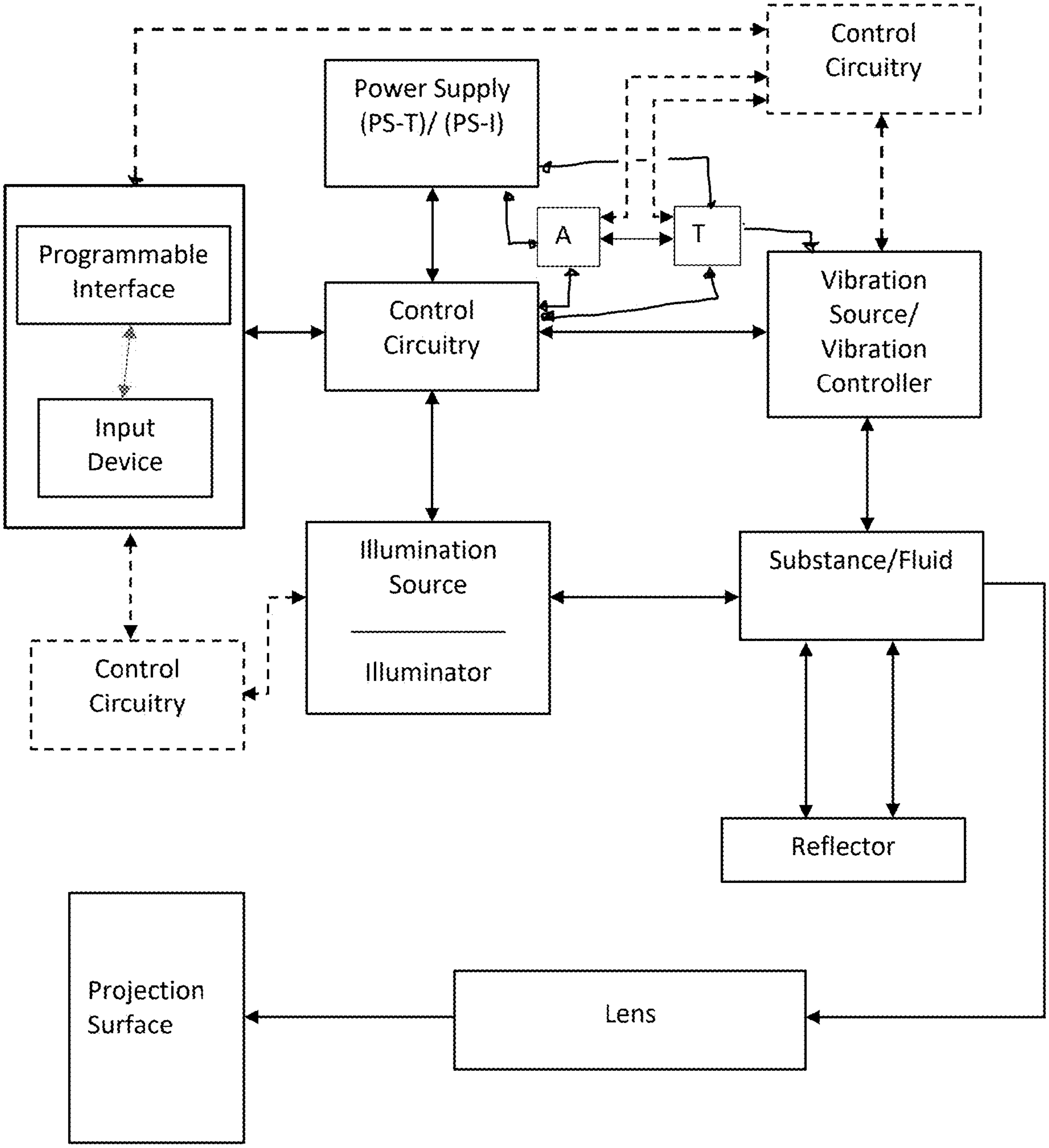
FIG. 3 is a flow diagram illustrating an exemplary embodiment of the system, method and device.

Referring to FIG. 3, there is illustrated a flow diagram to illustrate an exemplary implementation of devices, systems and methods. The depiction illustrates generally a power source, which may provide power to the transducer and/or illumination source. The power source is designated as a power supply, and may supply power to the components of the device that require power. For example, the power supply may provide power to the transducer (PS-T) and any associated components, such as an amplifier, tuner or the like. The power supply also may provide power to the illumination source (PS-I). Although a single block is shown representing the power supply, one or more power supplies may be used in conjunction with the devices and systems. The power preferably is supplied through control circuitry, which includes circuitry to regulate the power to provide the needs of the device components, e.g., for driving or operating lights, e.g., LEDs, and operating the transducer. The control circuitry represented by the solid line blocks illustrates examples where the control circuitry may control the illumination source 130 (e.g., LEDs 133), and the transducer 112, while the broken line block representations of the control circuitry shows one or more options where the control circuitry for controlling the illumination source 130 may be separate from control circuitry controlling the transducer 112. For each option a user interface may be provided, and may comprise a single or multiple user interfaces, and may control one or more features or components of the device. The user interface or interfaces may allow users to change certain settings or parameters of the device 110, such as the audible output of the transducer, type of audible output (tuner, audio selections, music, etc.), and the lighting, such as color or monochromatic light, or white light. The depiction in FIG. 3 shows a general arrangement of the device 110, where the lens delivers an output of focused light onto a surface, which is represented by the projection surface in the diagram. In FIG. 3, the amplifier A and tuner T are represented. These may be linked with or associated with the control circuitry, and in particular are configured to operate in conjunction with the transducer, to tune to an option of one or more channels, and/or to provide amplification of the signal being sent to the transducer. Although an amplifier and tuner are shown in separate blocks, they may be included as part of the control circuitry, transducer or other components of the device. In addition, other components, although represented by separate blocks may be included as part of or in association with one or more other components of the device. For example, according to some embodiments, the vibration or sound may be produced by an audio signal that may be generated using a suitable audio signal generation circuitry which may include or be associated with control signal generation circuitry. The audio signal generation may be carried out using a tuner and/or amplifier or other input. According to some embodiments, an audio signal also is communicated or linked to the control circuitry that controls the LEDs so that the LEDs, for example, the RGB LEDs may generate frequencies of light or colors that correspond with the audio signal.

Embodiments of the projection devices and systems may be configured with circuitry that may be preprogrammed for autonomous or programmed operation of the projections and cinematic output, or alternatively, may be configured to be operated by a user or users, with a user interface or interfaces. For example, a user may use a software application on a smartphone or another electronic device, or separate device, that is configured to allow the user to make selections or adjustments to one or more or both the vibration output or frequencies, as well as the lighting or light output intensity and/or colors.

The control mechanism for controlling the vibrations and/or the illumination source may be performed and/or implemented in one or more computing components, which may comprise a computer including a processor for executing appropriate instructions stored in a memory. The control circuitry may include or be configured to operate with or in conjunction with one or more computing components or circuitry which may include a processor controlled by instructions stored in a memory. The memory may be random access memory (RAM), read-only memory (ROM), flash memory or any other memory, or combination thereof, suitable for storing control software or other instructions and data. Some of the functions performed by the projection devices, systems and methods have been described with reference to flowcharts and/or block diagrams. Those skilled in the art should readily appreciate that functions, operations, decisions, etc. of all or a portion of each block, or a combination of blocks, or the connection between the blocks, of the flowcharts or block diagrams may be implemented as or in association with computer program instructions, software, hardware, firmware or combinations thereof. Those skilled in the art should also readily appreciate that instructions or programs defining the functions of the present invention (such as controlling or operating the transducer and the illumination source or sources) may be delivered to a processor in many forms, including, but not limited to, information permanently stored on tangible non-transitory non-writable storage media (e.g. read-only memory devices within a computer, such as ROM, or devices readable by a computer I/O attachment, such as CD-ROM or DVD disks), information alterably stored on tangible non-transitory writable storage media (e.g. floppy disks, removable flash memory and hard drives) or information conveyed to a computer through communication media, including wired or wireless computer networks. In addition, the control circuitry may be configured with embedded software or logic that generates or provides the functions to operate the projector devices and systems, including, according to some alternate embodiments, implementing the control circuitry in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components. The methods, devices and systems may be implemented with control circuitry that may comprise or have associated with it, hardware, software, or a combination of hardware and software. The methods, devices and systems may be implemented in a centralized fashion in at least one computing system, or in a distributed fashion where different elements are spread across several interconnected computing systems, or computing components, such as computers, personal computing devices, smart phones, tablets or other electronic devices. A typical combination of hardware and software may be a general-purpose computing device with a program or other code that, when being loaded and executed, controls the functions and operations of the LED and the acoustic vibrations. Control circuitry also may be implemented with an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

Although not shown the illumination source may include features, such as for example, a fan, temperature sensors, and circuitry to operate cooling functions, such as drawing air through the housing preferably in a manner that does not disturb the medium, such as the fluid. The medium preferably is transparent or allows at least some light to pass through the medium, however, in some other embodiments, the medium may block light and its movement may provide areas where the medium has moved to expose areas through which the light may pass.

It is intended that the foregoing detailed description be regarded as illustrative rather than limiting, and that it be understood that it is the following claims, including all equivalents, that are intended to define the spirit and scope of this invention. Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A catadioptric projection device comprising:

a) an illumination source;

b) a reflector;

c) a focusing element;

d) a vibration generator;

e) a fluid disposed between the reflector and the focusing element; and f) control circuitry configured to control one or more, or both of the vibrations and the illumination source;

g) wherein the illumination source is configured to pass through the focusing element, and produce a light output that is directed at the fluid and the reflector; and h) wherein the focusing element is disposed to receive reflected light reflected by the reflector and which passes through the fluid, and focus the light onto a surface.

2. The catadioptric projection device of claim 1, wherein the reflector comprises a curved mirror.

3. The catadioptric projection device of claim 2, wherein the curved mirror is a parabolic mirror.

4. The catadioptric projection device of claim 3, wherein the curved mirror has a center that is the vertex, and wherein the illumination source is disposed above the vertex.

5. The catadioptric projection device of claim 1, wherein the reflector comprises a curved mirror, wherein the focusing element comprises a lens, and wherein the lens has a first planar surface and a second surface that is a convex surface, and wherein the illumination source includes an illuminator, and wherein the illuminator is positioned to produce illumination at or after the plane of the first planar surface.

6. The catadioptric projection device of claim 5, wherein the illuminator comprises one or more LEDs.

7. The catadioptric projection device of claim 1, wherein the illuminator includes one or more components that produce light of a plurality of colors, wherein the control circuitry is configured to control the illumination source to produce strobing of the light.

8. The catadioptric projection device of claim 1, wherein the vibration generator comprises a transducer and produces cymatic movement of the fluid, and wherein the illumination source light is reflected off of the reflector through the fluid to light representing the cymatic movement induced in the fluid by the transducer, and wherein the projector projects cymatic images corresponding to the fluid movement.

9. The catadioptric projection device of claim 8, wherein the cymatic movement comprises cymatic patterns, and wherein the control circuitry is configured to strobe the illumination source to produce colored light strobing in relation to the cymatic patterns.

10. The catadioptric projection device of claim 9, wherein the cymatic image projected has an illusion of movement.

11. The catadioptric projection device of claim 1, wherein the surface comprises a projection surface disposed spaced apart from the lens to receive focused light from the lens, and display on the surface cinematic imagery of cymatic reflections of the fluid as the fluid is moved with the vibrations from the transducer.

12. The catadioptric projection device of claim 1, including a frame, and wherein the components of the device are supported on the frame.

13. The catadioptric projection device of claim 12, wherein the surface comprises a projection surface that is supported on the frame.

14. The catadioptric projection device of claim 5, wherein the light output from the lens is directed vertically.

15. The catadioptric projection device of claim 1, wherein the focusing element comprises a lens, and wherein the light output from the lens is directed horizontally.

16. The catadioptric projection device of claim 1, wherein the reflector comprises a mirror that has a curved, parabolic, flat or convex shape.

17. The catadioptric projection device of claim 1, wherein the reflector comprises a mirror, wherein the focusing element comprises a lens.

18. The catadioptric projection device of claim 17, wherein the lens has a first planar surface and a second surface that faces the direction where the device output is projected, wherein the illumination source includes an illuminator, and wherein the illuminator is positioned to produce illumination at or after the plane of the first planar surface of the lens, and wherein the device projects focused light from the lens onto a surface, and wherein the focused light comprises cinematic images corresponding to the movement of the fluid caused by the vibrations.

19. The catadioptric projection device of claim 8, wherein the vibration generator is configured to receive an input of audio signals, and wherein the audio signals are communicated to control circuitry that controls the LEDs, and wherein the LEDs comprise red, green and blue LEDs, and wherein the control circuitry for the LEDs controls the LEDs to correspond with the frequencies of the audio signals, and wherein the focused light from the focusing element focuses the reflected light from the LEDs that passes through the fluid and is reflected from the reflector produces cinematic images corresponding to the movement of the fluid caused by the vibrations, and wherein the colors of the cinematic images corresponding to the frequencies of the audio signals.

20. The catadioptric projection device of claim 1, wherein the focusing element comprises a lens.

* * * * *